United States Patent Office 3,263,556
Patented August 2, 1966

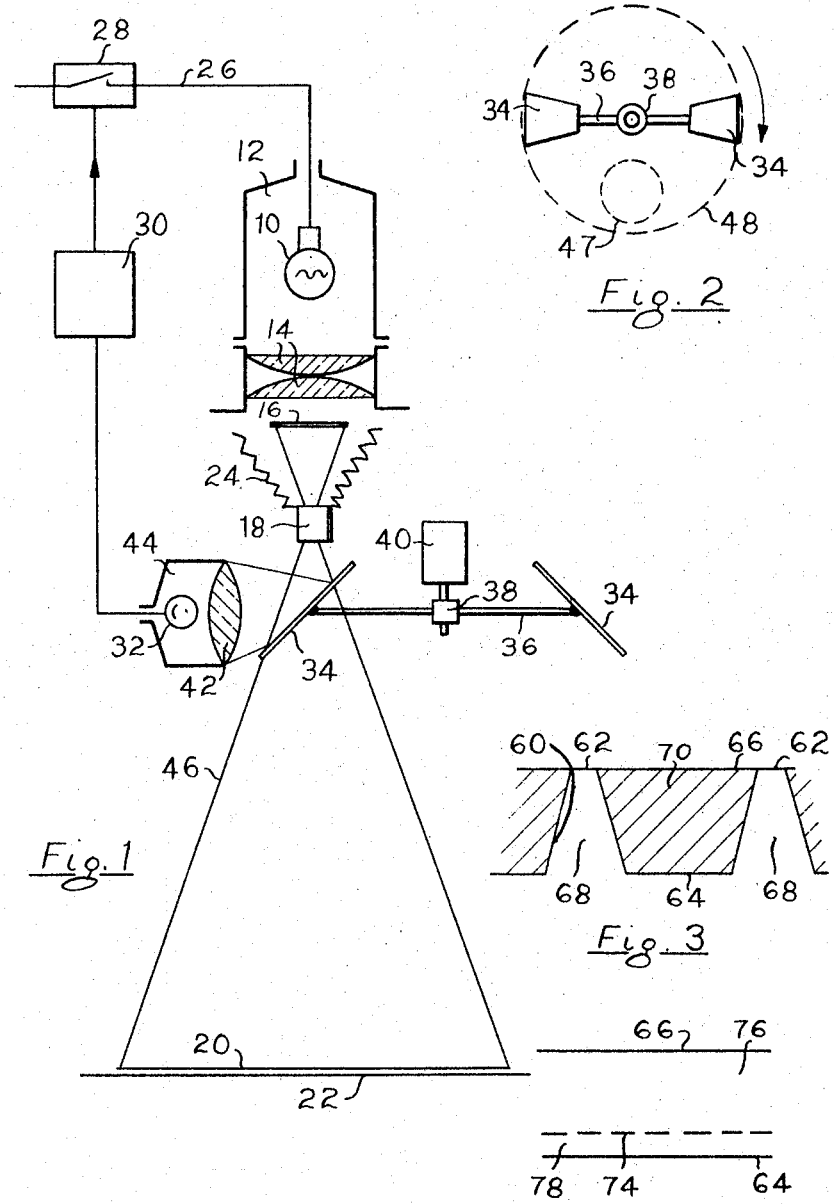

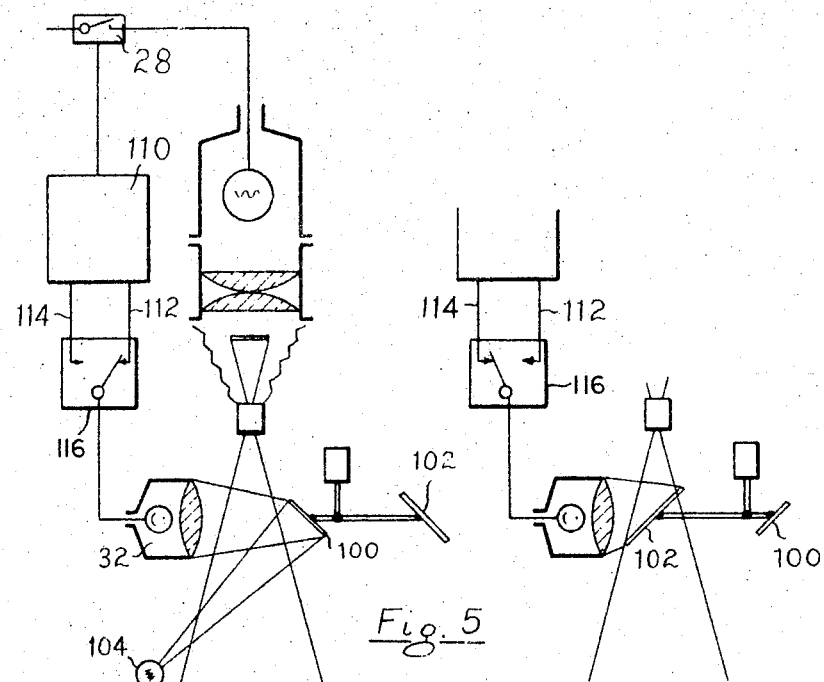
Fig. 5
Fig. 5a
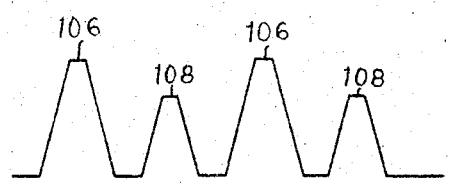
Fig. 7
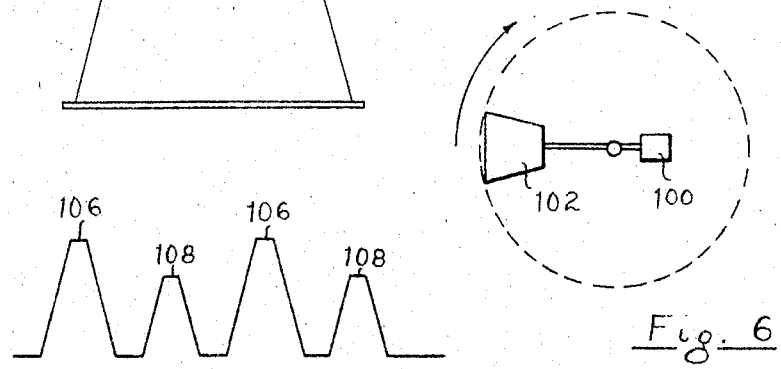
Fig. 6

3,263,556
PHOTOGRAPHIC COPYING APPARATUS
Hansjuerg Mey, Oberengstringen, Switzerland, assignor to Gretag Aktiengesellschaft, Regensdorf, Switzerland
Filed June 17, 1963, Ser. No. 288,381
Claims priority, application Switzerland, June 26, 1962, 7,695/62
8 Claims. (Cl. 88—24)

This invention relates to a photographic copying apparatus in which the correct time of exposure is regulated automatically by means of a photosensitive element.

Copying apparatus both for black-and-white and for coloured photographic images have already been proposed in which the correct time of exposure is automatically adjusted by measuring the intensity of the light flow passing through an original, negative or the like by means of a photosensitive element, for example a photo-electric cell. The photo-electric cell operates, through an integrating capacitor arrangement, a relay which switches off the source of light when the necessary exposure is attained. The photo-electric cell should respond to the transparency over the entire surface of the original or of a previously selected important part of the image, and must therefore measure the entire flow of light passing through the original or the selected portion of the image.

For this purpose various principles are utilized. The photo-electric cell may be accommodated in a position which, referred to the source of light, is behind the photographic material to be exposed, in a housing which, in the manner of an Ulbricht globe, forms the mean value of the light passing through the material. Arrangements of this type have the disadvantage, particularly when coloured copies are produced, that the thickness and colour, which are not accurately defined, of the carrier of the photosensitive material, for example, baryta coated paper, falsify the measurement, and that there is a very great loss of light. It has also been proposed to measure the stray light reflected by the photosensitive material or to incorporate semi-transparent mirrors in the path of the rays, in order to direct a part of the light on to the photoelectric cell.

It is an object of the present invention to further improve this last mentioned arrangement.

According to the present invention there is provided a photographic copying apparatus comprising a light source and lenses for transmitting a beam of light through an original or the like to be copied onto photosensitive material, a photo-sensitive element, and means operable by the photosensitive element for regulating the exposure time, characterised in that at least one mirror is movable into said beam periodically for a short time so as to direct the beam onto the photosensitive element.

In order to enable the invention to be more readily understood, reference will now be made to the accompanying drawings, which illustrate diagrammatically and by way of example two embodiments thereof, and in which:

FIG. 1 is a diagrammatic section of a photographic copying apparatus,

FIG. 2 is a plan view of rotatable mirrors used in the apparatus shown in FIG. 1, FIG. 3 shows graphically the apportioning in respect of time, to the material to be exposed and to a photosensitive element, of the light passing through the negative, FIG. 4 is a graphical representation serving for comparison with known arrangements having semi-transparent mirrors, FIGS. 5 and 5a show the same arrangement as FIG. 1, but with the use of an intensity reference, FIG. 6 is a plan view of a mirror used in the arrangement shown in FIG. 5, and FIG. 7 shows a train of impulses such as occurs as a voltage path from a photo-sensitive element.

Referring now to FIGS. 1 and 2, there is shown a photographic copying apparatus including an enlarger of conventional construction, having an incandescent lamp 10 as the source of light. The lamp 10 is disposed within a lamphouse 12 which carries a condenser consisting of two lenses 14, behind which the original, for example a negative 16, which according to the illustration is to be enlarged, is situated, said negative being projected by an objective 18 on to a photo-sensitive photographic material 20 on a support 22. In order to avoid stray light, the rays travel between the original 16 and the projection lens 18 inside bellows 24. A supply cable 26 for the lamp 10 contains a switch 28 which is operable to control the time of exposure by means of a photosensitive element, consisting of a photo-electric cell 32, through a time control device 30. According to the present invention, there is situated, behind the original in the path of the exposure beam, at least one mirror which is periodically introduced for only a short period of time into the path of the rays, there being in the case illustrated two trapezoidal rotatable mirrors 34. The mirrors are fastened on a hub 38 by arms 36, and are driven by a motor 40 at constant speed. The axis of rotation of the mirrors is so disposed that they project into the path of the rays in each case only during a small portion of their rotation. During the short period of time in which one of the two mirrors 34 projects into the beam of rays 46, issuing from the objective 18, the entire beam of rays issuing from the objective is diverted towards the photo-electric cell 32 which is situated behind a lens 42 in a housing 44.

The two trapezoidal mirrors 34 are so inclined that they deflect towards the photo-electric cell 32 the light coming from the objective. The mirrors cover only a small portion of the circle of rotation 48, in the example illustrated only 1/12 of the periphery, so that 5/6 of the total periphery remain free. On the rotation of the mirrors the beam of rays 46 indicated by the circle 47 shown in a broken line thus mainly falls unobstructed on to the material to be exposed. Only during the short period of time during which one of the mirrors 34 projects into the beam of rays 46 is the material 20 shaded and the light diverted on to the photo-electric cell 32.

FIG. 3 shows diagrammatically the apportioning of the pencil of rays, in respect of time, to the photosensitive material and the photo-electric cell. The curve 60 shows the time pattern of the intensity of the current of light reaching the photo-electric cell 32. The straight line 66 corresponds to the mean light intensity over the entire original. During a short period of time the intensity of the light in the photo-electric cell assumes a maximum value coinciding with the intensity 66, then drops steeply to the zero value 64, rising again to the value 62 after a period of time corresponding to the peripheral speed of the mirrors 34. The photo-electric cell thus receives short light impulses, the duration of which is small in relation to the intervals of time between them, corresponding to the division of the periphery of the area swept by the rotating mirrors into the mirror surface and non-mirror surface. In the embodiment illustrated, about 1/6 of the total quantity of light (light intensity time integral) reaches the photo-electric cell, while 5/6 are available for the exposure of the photosensitive material. The shaded area 70 corresponds to the amount of light reaching the photosensitive material and the area 68 corresponds to the amount of light reaching the photoelectric cell.

FIG. 4 shows the corresponding conditions in known arrangements having semi-transparent mirrors. In these arrangements the amount of light is not distributed in respect of time but in respect of intensity. With the same total intensity therefore the area 76 corresponds to the intensity reaching the material and the area 78 to the intensity reaching the photo-electric cell. If it is desired when using semi-transparent mirrors to obtain the same proportion as in the present arrangement, the light now reaching the photo-electric cell during the entire time attains only the low value indicated by the line 74, which is equal to ⅙ of the maximum value 66.

The arrangement is advantageously combined with an intensity reference. It is possible thereby to eliminate variations in sensitivity of the photosensitive element. One possible construction of an arrangement of this type is illustrated in FIGS. 5, 5a and 6. The arrangement corresponds in principle to FIG. 1, but in addition to the mirror 102 (or mirrors if desired) serving to measure the light passing through the original, the mirror system has in addition at least one reference mirror 100. In the position shown in FIG. 5, the reference mirror 100 throws the light of a constant reference light source 104 on to the photo-electric cell 32. In the position shown in FIG. 5a (turned through 180°) the measuring mirror 102 throws the copying light on to the photo-electric cell 32. The measuring mirror 102 and reference mirror 100 are so disposed that they cannot simultaneously throw measuring light and reference light on to the photo-electric cell. On the rotation of the mirror system however, the photo-electric cell alternatively receives measuring and reference impulses.

FIG. 7 shows a train of impulses such as comes for example from the photo-electric cell, 106 indicating the image impulses and 108 the reference impulses. In the figure the reference impulses are shown smaller, but this need not always be the case. The train of impulses issuing from the photo-sensitive element is fed to a vibrator 116, which divides the signal into a chain of reference impulses 112 and a chain of image impulses 114. The vibrator 116 runs synchronously with the mirror system. The two trains of impulses 112 and 114 are compared with one another in an electronic device 110, for example by forming quotients of the two impulses, and the resulting information serves to control the lighting switch 28.

An advantage of the present apparatus as compared with an arrangement having semi-transparent mirrors consists in that the photo-electric cell receives the same lighting power with maximum intensity, referred to the time intensity integral. The noise and dark current distance of the photo-electric cells, which are very sensitive because of their high internal resistance and the correspondingly high resistances of the connection circuit arrangement, is considerably improved in the present arrangement by the fact that the photo-electric cell receives light impulses which in each case are of the highest possible intensity, so that a maximum noise and dark current distance ratio is obtained. In addition it is consequently possible in most cases to operate with relatively simple, insensitive elements, that is to say for example to use photo-electric cells instead of multipliers.

Another advantage consists in that through the rotating mirrors the light falling on the photosensitive element is chopped. At the output of the photo-sensitive element there is accordingly obtained an alternating current voltage or an alternating current, the further processing of which is possible without difficulty in the measuring and balancing circuit arrangement.

The present invention is naturally not restricted to the arrangement illustrated. Instead of the exposure time, the intensity of the light source may also, if desired, be regulated. In addition, it is for example possible to use the motor required for driving the mirror discs simultaneously for other purposes, for example for driving a fan, since the time intensity integral of the series of light impulses is not dependent on the speed of rotation, so that it is not necessary for the speed of the motor to be maintained accurately. In addition, instead of rotating mirrors it is possible to use periodically movable, for example oscillating mirrors. In this case for example a magnet arrangement can be used instead of the motor for driving the mirrors. Instead of the flat mirrors shown in the embodiment illustrated as an example, other mirrors can also be used, for example hollow mirrors. In this case the mirror simultaneously takes over the function of the lens 42.

For the purpose of making coloured prints, a plurality of individual mirrors associated with the individual partial colours can also be used. For example, the individual mirrors can be provided with corresponding colour filters, or the individual mirrors can have surfaces coloured to correspond to the partial colours.

The arrangement can also be used in apparatus in which the photosensitive element does not control the time of exposure or intensity direct, but merely feeds an indicating or measuring instrument in accordance with the indication of which an operator then controls the exposure.

What is claimed is:

1. In a photo copying apparatus comprising means for holding an original to be copied, a light source and lenses for transmitting a beam of light through said original onto photosensitive material, a photosensitive element, means for regulating the exposure time operable by said photosensitive element, a constant light source serving as an intensity reference, at least one first mirror, at least one second mirror and means for periodically moving said first mirror into said beam between the original to be copied and the photosensitive material for a short duration to direct the whole beam onto the photosensitive element and then periodically moving said second mirror to direct the light from said constant light source onto said photosensitive element so that the latter receives in turn the copying light with its whole intensity from said first mirror and then the reference light from said second mirror.

2. The improvement in a photo copying apparatus defined in claim 1, wherein the sum of said short periods in which the whole beam of the copying light is directed onto the photosensitive element amount to at most about ⅙ of the total copying time.

3. The improvement in a photo copying apparatus defined in claim 1, wherein said mirror moving means is arranged to oscillate said mirrors.

4. In a photo copying apparatus comprising means for holding an original to be copied, a light source and lenses for transmitting a beam of light through said original onto photosensitive material, a photosensitive element, means for regulating the exposure time operable by said photosensitive element, a constant light source serving as an intensity reference, at least one first mirror, at least one second mirror, a shaft, at least one arm on said shaft supporting on its one end one of said first mirrors, and on its other end one of said second mirrors, and motor means for rotating said shaft and arm for periodically moving said first mirror into said beam between the original to be copied and the photosensitive material for a short period to direct the whole beam onto the photosensitive element and then periodically moving said second mirror to direct the light from said constant light source onto said photosensitive element so that the latter receives in turn the copying light with its whole intensity from said first mirror and then the reference light from said second mirror.

5. The improvement in a photo copying apparatus defined in claim 4, wherein said first mirrors cover at most ⅙ of its circle of rotation.

6. The improvement in a photo copying apparatus defined in claim 4, wherein said first and said second mirrors are hollow mirrors.

7. The improvement in a photo copying apparatus defined in claim 4 and adapted for producing coloured copies, wherein each first mirror is associated with an individual partial colour.

8. The improvement in a photo copying apparatus defined in claim 7, wherein each first mirror has a surface coloured to correspond to an individual partial colour.

References Cited by the Examiner

UNITED STATES PATENTS 3,120,782  2/1964  Goddard et al. ........ 88—24
3,170,022  2/1965  Reesen ............ 88—24 X NORTON ANSHER, *Primary Examiner.*

RICHARD A. WINTERCORN, *Assistant Examiner.*